United States Patent
Wood

(10) Patent No.: US 7,293,489 B1
(45) Date of Patent: Nov. 13, 2007

(54) CARRYING CASE ASSEMBLY FOR A CIRCULAR SAW AND ITS ASSOCIATED METHOD OF USE

(76) Inventor: Michael D. Wood, 105 Fairacres Dr., Lansdale, PA (US) 19446

( * ) Notice: Subject to any disclaimer, the term of this patent is extended or adjusted under 35 U.S.C. 154(b) by 290 days.

(21) Appl. No.: 10/976,219

(22) Filed: Oct. 28, 2004

(51) Int. Cl.
B26D 5/00 (2006.01)

(52) U.S. Cl. .................. 83/167; 83/746; 83/743; 206/349; 206/303; 144/285; 312/294; 312/307; 312/902

(58) Field of Classification Search .......... 206/349, 206/303; 312/902, 237; 220/476; 83/743, 83/746; 144/285
See application file for complete search history.

(56) References Cited

U.S. PATENT DOCUMENTS

| | | | | |
|---|---|---|---|---|
| 2,697,460 A | * | 12/1954 | Barnett | 144/285 |
| 2,759,507 A | * | 8/1956 | Davis et al. | 144/285 |
| 2,786,500 A | * | 3/1957 | Unterfranz | 144/285 |
| 3,578,153 A | | 5/1971 | Olson | 206/17 |
| 4,109,901 A | * | 8/1978 | Akin | 269/290 |
| 4,252,239 A | * | 2/1981 | Snyder | 206/349 |
| 4,276,799 A | * | 7/1981 | Muehling | 83/473 |
| 4,428,159 A | * | 1/1984 | Sigetich et al. | 451/213 |
| 5,042,348 A | * | 8/1991 | Brundage et al. | 83/471.3 |
| 5,161,590 A | * | 11/1992 | Otto | 144/286.5 |
| 5,165,317 A | * | 11/1992 | Findlay | 83/574 |
| 5,339,956 A | | 8/1994 | Thomason | 206/372 |
| 5,533,843 A | | 7/1996 | Chung | 408/241 |
| 6,427,677 B1 | * | 8/2002 | O'Banion et al. | 125/23.02 |

* cited by examiner

*Primary Examiner*—Mickey Yu
*Assistant Examiner*—Steven Pollicoff
(74) *Attorney, Agent, or Firm*—LaMorte & Associates

(57) ABSTRACT

A carrying case device for a circular saw and the method of interconnecting the circular saw with the carrying case device when the circular saw is in use. A case is provided having a top surface, wherein the case defines an internal area large enough to store the circular saw. A miter assembly is provided that is attached to the top surface of the case. The miter assembly can be rotated on the case. The miter assembly also includes a guide arm that can be lifted and closed about a hinge connection. The guide arm contains a mounting receptacle for selectively receiving and engaging the circular saw. As a result, the circular saw can be raised and lowered against a work piece as though it were a power miter saw.

13 Claims, 4 Drawing Sheets in # CARRYING CASE ASSEMBLY FOR A CIRCULAR SAW AND ITS ASSOCIATED METHOD OF USE

BACKGROUND OF THE INVENTION

1. Field of the Invention

In general, the present invention relates to carrying cases that hold power tools. More particularly, the present invention relates to both carrying cases for circular saws and miter jigs for circular saws.

2. Description of the Prior Art

There are many different types of power hand tools. Many power hand tools are sold in cases that can be used to carry the tool. The carrying case for a power hand tool typically has a main compartment that is sized to receive the power tool itself. The carrying case may also have secondary compartments for holding bits, blades, cords or batteries that are used by the power hand tool. The carrying case for a power hand tool protects the tool and makes the tool easier to transport. Furthermore, by holding accessories for a power tool in the carrying case, those accessories are transported with the power tool. This makes it easy for the power tool to be conveniently adjusted, or have its cutting blade changed.

Prior art power tool carrying cases that carry both a power tool and the accessories for that power tool are exemplified by U.S. Pat. No. 3,578,153 to Olsen, entitled Drill Holder Device, which shows a carrying case for a drill and a holder for different drill bits within the same carrying case.

In the prior art, the carrying case for a tool rarely has any secondary function other than to hold a power tool and the accessories commonly used in association with the power tool. Typically, any such specialized carrying case would only provide a medium to power the tool being carried. For instance, in U.S. Pat. No. 5,533,843 to Chung, entitled, Electric Hand Drill Set, the carrying case of a power drill is described that plugs into an electrical outlet. The carrying case then recharges a battery operated drill when the drill is stored within the carrying case.

In U.S. Pat. No. 5,339,956 to Thomason, entitled Tool Box With Combined Elements, a tool carrying case is provided that contains an internal power extension cord. In this manner, the carrying case can be used as the medium to power any power tool carried in the carrying case.

Hand held power tools are often stored and carried in carrying cases for convenience. Since hand held tools are guided by a user's hand, such tools are good for general work. However, instability inherent in a hand held tool often makes those tools poorly suited for precise work. If precision is needed in working some material, that material is typically taken to a corresponding bench top tool. Bench top tools rest on stable platforms and do not rely on the steadiness of a user's hand for their operation. For example, if holes have to be precisely drilled in a piece of metal at exact points, a person typically would not be able to achieve such precision with a handheld drill. Rather, the piece of metal would be taken to a drill press that can drill such precise holes.

Recognizing that sometimes precision is important, there exist many types of accessories for hand tools that increase the precision of the hand tool and cause the hand tool to perform more like a bench mounted tool. For example, router tables exist for routers that hold the router in an exact position as wood is passed across the router's bit. Similarly, drill guides exist for hand held drills that ensure the drill bit is straight as it drills through material. Auxiliary guides also exist for circular saws, saber saws and most other cutting tools. However, such accessory guides are typically bought separately from the power tool and cannot be stored in the carrying case of the power tool. It is therefore inconvenient to carry the accessories and the power tool in separate cases.

Although various carrying cases do exist for tools that provide power to the tools, prior art carrying cases have not been configured as an accessory to a power tool so that the power tool can be used with more precision. The need therefore exists for a carrying case for a power tool that can be attached to the power tool to increase the precision and stability of the power tool. This need is met by the present invention as claimed and described below.

SUMMARY OF THE INVENTION

The present invention is a carrying case device for a circular saw and the method of interconnecting the circular saw with the carrying case device when the circular saw is in use. The carrying case includes a case having a top surface, wherein the case defines an internal area large enough to store the circular saw. A miter assembly is provided that is attached to the top surface of the case. The miter assembly can be rotated on the case. The miter assembly also includes a guide arm that can be lifted and closed about a hinge connection. The guide arm contains a mounting receptacle for selectively receiving and engaging the circular saw. As a result, the circular saw can be raised and lowered against a work piece as though it were a power miter saw.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE DRAWINGS

Although the present invention carrying case system can be used to carry most any type of portable circular saw, the carrying case system is best suited for use in carrying a cordless circular saw. Accordingly, by way of example, the present invention carrying case system will be illustrated and described in use with a cordless circular saw. Such an embodiment, however, is merely exemplary and is presented to set forth the best mode contemplated for the invention. It will be understood that traditional corded circular saws can also be used, and are intended to be included within the scope of this invention.

Figure 1:
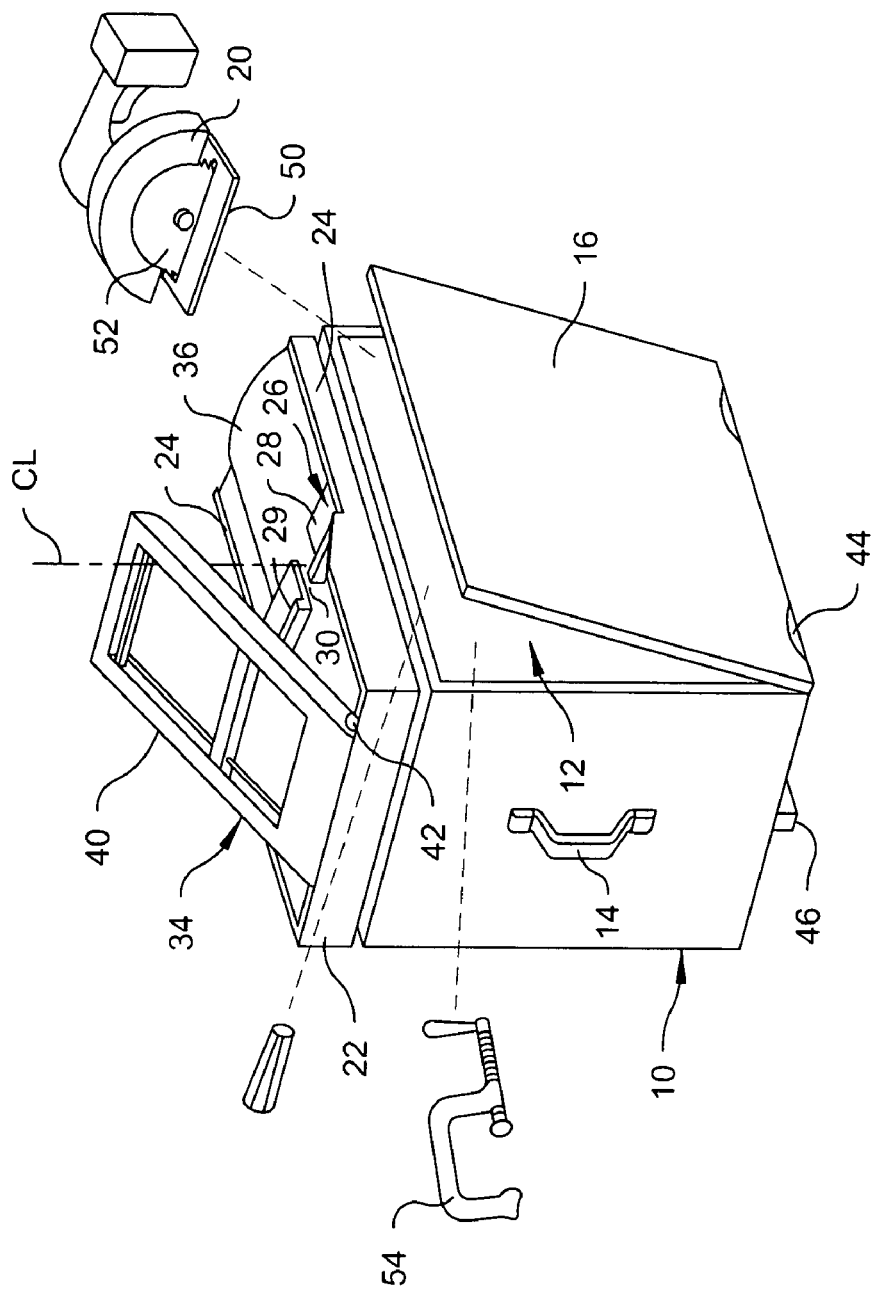
FIG. 1 is an open perspective view of a carrying case showing a circular saw and accessories that may be contained within the carrying case.

Referring to FIG. 1, there is shown a first embodiment of a carrying case 10 in accordance with the present invention. The carrying case 10 is a rigid case defining an open internal area 12. At least one handle 14 is provided so that the carrying case 10 can be easily lifted and carried. The carrying case 10 has a side panel door 16 that enables the internal area 12 of the carrying case 10 to be easily accessed. The interior area 12 defined by the carrying case 10 is large enough to hold a circular saw 20 and its accessories when the circular saw 20 is not in use.

The carrying case 10 is formed with a specialized top section 22. The top section 22 has opposite side walls 24. A work piece support platform 26 extends across the top section 22 between the opposite side walls 24. The work piece support platform 26 has a flat bottom surface 28 and a fence 29 that extends upwardly from the rear of the flat bottom surface 28. An open section 30 is disposed through the work piece support platform 26 to allow for the passage of a circular saw cutting blade in different orientations, as will later be explained.

A miter assembly 34 is disposed in the center of the top section 22 of the carrying case 10. As will later be explained in more detail, the miter assembly 34 includes a base 36 and a guide arm subassembly 40 that extends form the base 36. The base 36 of the miter assembly 34 can be selectively rotated about a center line CL of rotation.

The guide arm subassembly 40 joins to the base 36 at a compound hinge 42. The guide arm subassembly 40 can be selectively raised and lowered by turning the guide arm subassembly 40 about the compound hinge 42. Furthermore, the plane of the guide arm subassembly 40 can also be altered by rotating the compound hinge 42.

Along the bottom of the carrying case 10 are disposed clamping recesses 44. The clamping recesses 44 are used to mount the carrying case 10 to a tabletop or other support structure, as will later be described. Additionally, a clamping rail 46 can be attached to the bottom of the carrying case 10. The clamping rail 46 provides a surface that can be engaged by a vise and therefore provides a means to attach the carrying case 10 to a tabletop.

As has been mentioned, the carrying case 10 defines an internal area 12 that is used to hold a circular saw 20 and various accessories. The circular saw 20 can be any current commercial make or model, provided the circular saw 20 has a skid plate 50. The skid plate 50 is the slotted plate through which extends the circular saw blade 52. The skid plate 50 is designed and positioned to slide along the surfaces of the work being cut. Portable circular saws typically have a rectangular skid plate.

Also contained within the carrying case 10 are mounting clamps 54 and an adjustment handle 56. The purpose of these elements will be later described.

Figure 2:
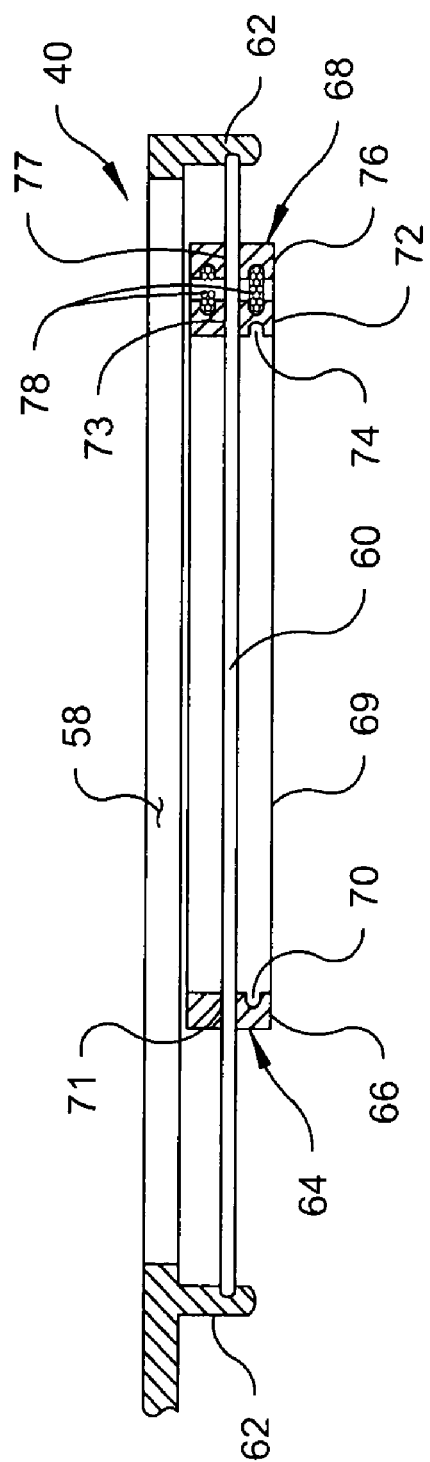
FIG. 2 is a fragmented side view of an exemplary embodiment of the guide arm subassembly of the carrying case shown in FIG. 1.

Referring now to FIG. 2, an exemplary embodiment of the bottom of the guide arm subassembly 40 is shown. As can be seen, an elongated opening 58 is disposed down the center of the guide arm subassembly 40. On either side of the opening 58 are mounted raised rails 60. The raised rails 60 are suspended between stationary mounts 62 and run in parallel.

A sled 64 is provided that runs along the length of the rails 60 in between the stationary mounts 62. The sled 64 is comprised of a front plate clamp 66 and a rear plate clamp assembly 68 that are bound together by side elements 69. The front plate clamp 66 has two holes 71 that run through it. The rails 60 freely pass through these holes 71. As a consequence, the front plate clamp 66 can move along the length of the rails 60. A slot 70 is formed in the surface of the front plate clamp 66 that faces the rear plate clamp assembly 68. The slot 70 is sized and shaped to receive the front edge of the skid plate 50 of the circular saw 20.

The rear plate clamp assembly 68 is comprised of two elements. The first element 72 defines two holes 73 through which the rails 60 freely pass. A slot 74 is formed in the surface of the first element 72 that faces the front plate clamp 66. The second element 76 of the rear plate clamp assembly 68 also has two holes 77 through which the rails 60 freely pass. The first element 72 and the second element 76 are joined together by a set of springs 78 that bias the first element 72 and the second element 76 a predetermined distance apart. As such, both the first element 72 and the second element 76 of the rear plate clamp assembly 68 can travel freely along the rails 60. However, the distance between the first element 72 and the second element 76 can be selectively altered by compressing the springs 78.

The front plate clamp 66 and the rear plate clamp assembly 68 are joined together by the side elements 69, therein completing the sled 64. It will therefore be understood that the sled 64 can reciprocally move along the length of the rails 60 as a unit.

Figure 3:
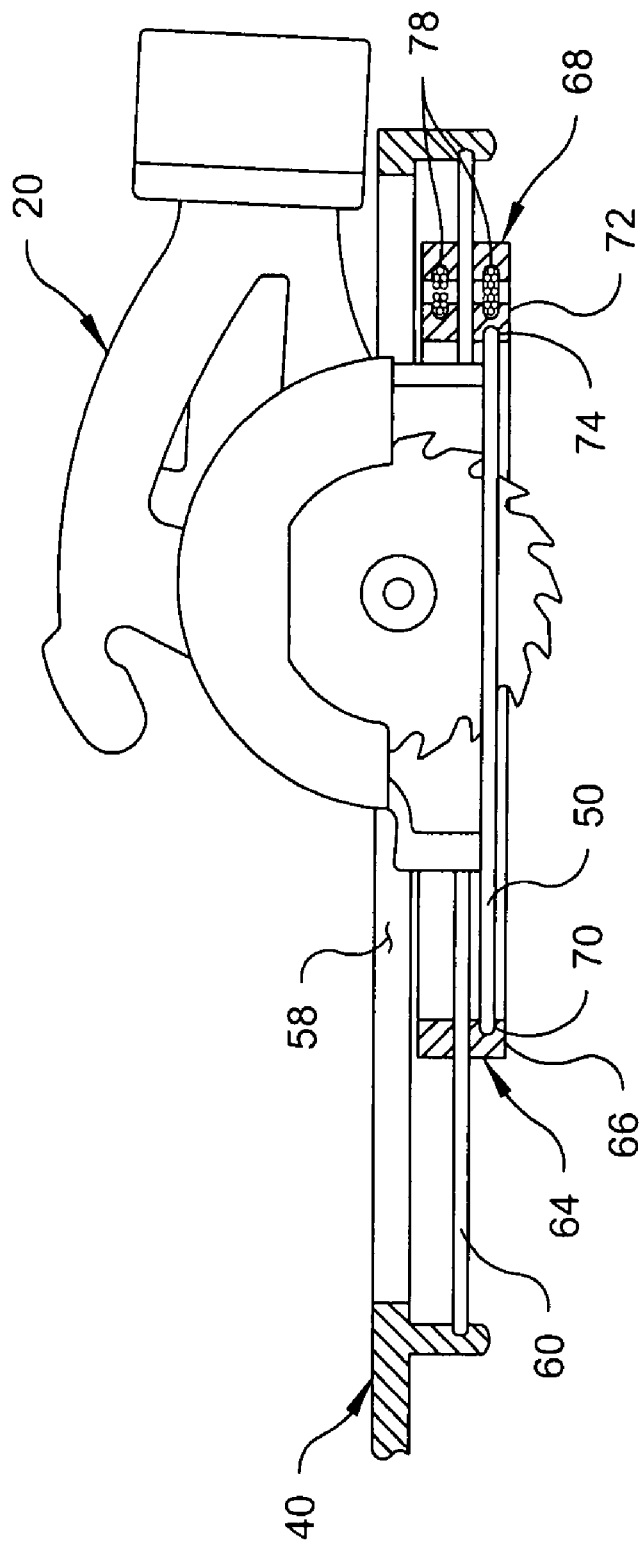
FIG. 3 is a fragmented side view of the guide arm subassembly shown engaging a portable circular saw.

Referring to FIG. 3, it can be seen that to mount a circular saw 20 to the sled 64, the skid plate 50 of the circular saw 20 passes through the opening 58 in between the mounted raised rails 60. The skid plate 50 is then positioned in between the front plate clamp 66 and the rear plate clamp assembly 68. However, the main body of the circular saw 20 remains above the guide arm subassembly 40. The skid plate 50 of the circular saw 20 is engaged by both the slot 70 in the front plate clamp 66 and the slot 74 in the first element 72 of the rear plate clamp assembly 68. The first element 72 is biased against the skid plate 50 by the springs 78. It will therefore be understood that to remove the circular saw 20 from the sled 64, or to initially place the circular saw 20 into the sled 64, the springs 78 are compressed and the first element 72 of the rear clamp assembly 68 is moved backward against the spring bias to make room for the skid plate 50. However, once in place, the springs 78 bias the first element 72 against the skid plate 50, thereby locking it in place.

Once the circular saw 20 is attached to the sled 64, the circular saw 20 can move back and forth along the length of the rails 60 with the sled 64. As such, the circular saw 20 can be selectively moved to any point along the length of the rails 60.

Figure 4:
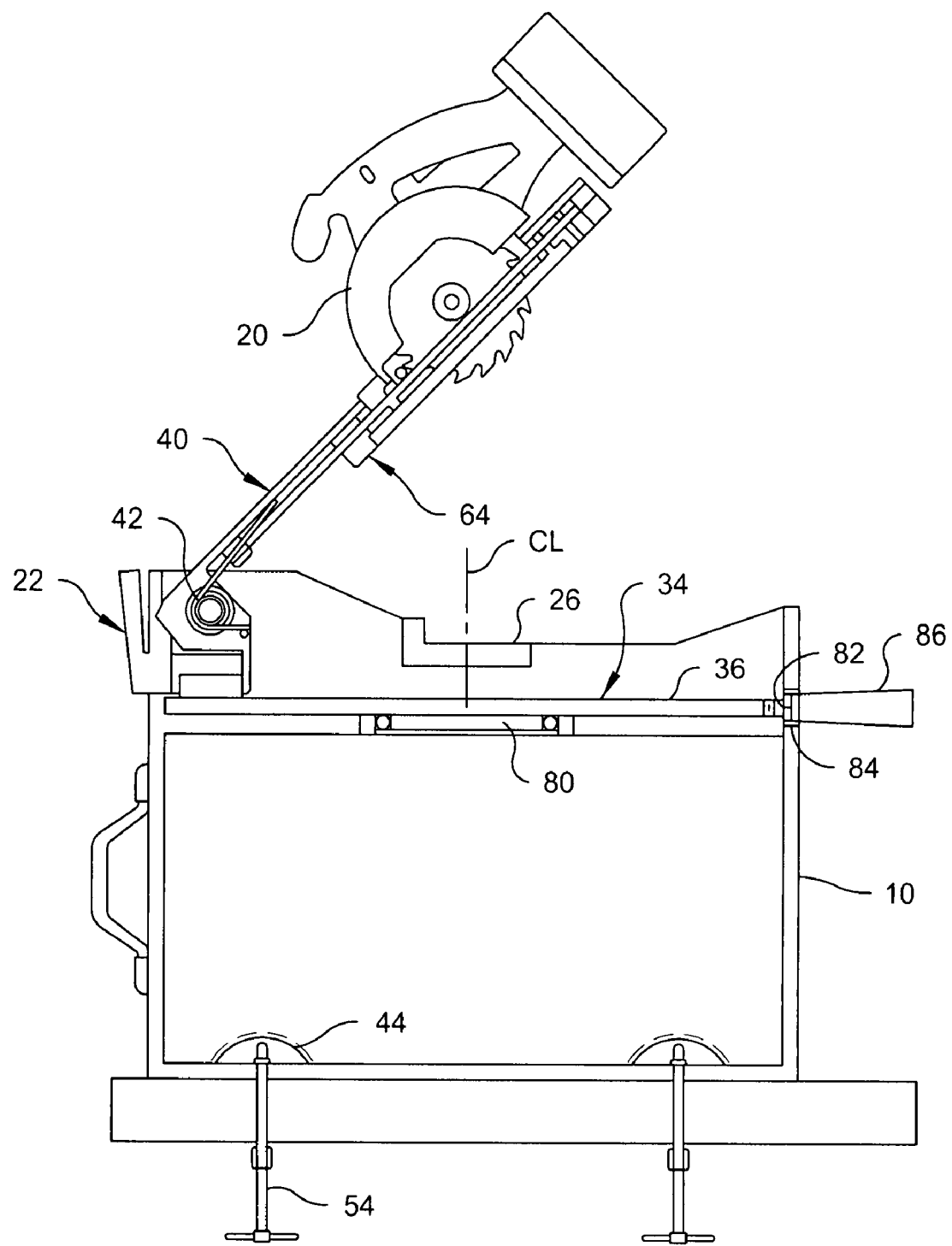
FIG. 4 is a selectively cross-sectioned view of an assembly consisting of a circular saw and a carrying case.

Referring to FIG. 4, the entire carrying case system is shown with the circular saw 20 attached to the sled 64 in the guide arm subassembly 40. The miter assembly 34, that supports the guide arm subassembly 40, is mounted to a pivot joint 80. The pivot joint 80 joins the miter assembly 34 to the carrying case 10 and enables the miter assembly 34 to be selectively rotated about the center line of rotation (CL).

A threaded shaft 82 extends outwardly from the base 36 of the miter assembly 34 and passes through a long open groove 84 in the top section 22 of the carrying case 10. The threaded shaft 82 moves back and forth within the long groove 84 as the miter assembly 34 is rotated about the pivot joint 80. A scale is present on the carrying case 10 immediately above the long groove 84, that shows the angle of rotation for the base 36 around the pivot joint 80. An adjustment handle 86 that was previously stored within the carrying case 10 can now be used to engage the threaded shaft 82. By tightening the adjustment handle 86, the adjustment handle 86 will lock against the carrying case 10, thereby locking the threaded shaft 82 and the remainder of the miter assembly 34 into a fixed position. It will therefore be understood that by selectively tightening the adjustment handle 86, the miter assembly 34 can be locked into different positions as it is rotated around the pivot joint 80. The angle of rotation for the miter assembly 34 can be determined by the position of where the adjustment handle 86 is tightened.

As the miter assembly 34 is adjusted in position, the angle between the blade 32 of the circular saw 20 and the work piece support platform 26 changes. Thus, the blade 32 of the circular saw 20 can cut wood placed on the work piece support platform 26 at a variety of angles.

In addition to being adjustable around the center line of rotation CL with the miter assembly 34, the mounted circular saw 20 can also move with the sled 64 back and forth along the length of the guide arm subassembly 40. Furthermore, the compound hinge 42 at the end of the guide arm assembly 40 may be adjustable so that the blade 32 of the circular saw 20 can be selectively moved out of the vertical and into other planes to make compound cuts. The overall miter assembly 34, therefore, enables the portable circular saw 20 to be mounted to produce a compound miter saw.

In the embodiment of FIG. 4, the carrying case 10 is being clamped to a tabletop. This is achieved through the use of the mounting clamps 54 that pass over the tabletop and engage the clamping recesses 44 formed along the bottom of the carrying case 10. However, a clamping rail 46 (FIG. 1) can also be provided that attaches to the bottom of the carrying case 10. Many commercially available work benches have a vise clamp built into the top of the workbench. The clamping rail on the carrying case 10 provides a structure that can be engaged by such a vise clamp. In this manner, mounting clamps 54 need not be used to attach the carrying case 10 to a workbench.

The embodiment of the circular saw that is illustrated in this specification is merely exemplary. Many different types of circular saws exist other than has been illustrated. It will be understood that the present invention carrying case system can be adapted for use with any circular saw having a flat skid plate. All such variations, modifications and alternate embodiments are intended to be included within the scope of the present invention as defined by the appended claims.

What is claimed is:

1. A carrying case device for a portable circular saw having a blade and a skid plate, said device comprising:
   a case having a top surface, wherein said case defines an internal area large enough to store the circular saw;
   a miter assembly having a rotatable base that is mounted to said top surface of said case, and a guide arm that is coupled to said base at a hinge connection, said guide arm containing a mounting receptacle for selectively receiving and engaging said circular saw, wherein said base of said miter assembly is selectively rotatable around a center of rotation on said top surface of said case; and
   a locking mechanism for selectively locking said base of said miter assembly in a set position around said center of rotation.

2. The device according to claim 1, wherein said mounting receptacle is part of a sled that can reciprocally move on said guide arm.

3. The device according to claim 1, wherein said mounting receptacle engages and retains the skid plate of the circular saw.

4. The device according to claim 1, wherein said mounting receptacle includes opposing clamp elements that are biased toward each other by at least one spring.

5. The device according to claim 1, further including a work piece support mounted to said case that supports objects under said guide arm.

6. The device according to claim 1, wherein said hinge connection is selectively adjustable, therein enabling the blade of said circular saw to be set into a range of different planes.

7. The device according to claim 1, further including recesses disposed in said case and clamps that engage said recesses for clamping said case to a secondary structure.

8. A method of mounting a portable circular saw, comprising the steps of:
   providing a portable circular saw having a skid plate;
   providing a carrying case large enough to store the circular saw within said carrying case, said carrying case having a top surface;
   providing a miter base that is connected to said top surface of said carrying case, wherein said miter base is free to rotate relative said top surface of said carrying case in a plane that is parallel to said top surface of said carrying case;
   providing a miter guide arm that is attached to said miter base with a hinge connection, wherein said miter guide arm rotates with said miter base relative said top surface of said carrying case; and
   selectively attaching the portable circular saw to the miter guide arm.

9. The method according to claim 8, further including the step of clamping the carrying case to a stationary object that supports said carrying case.

10. The method according to claim 9, wherein said step of attaching the portable circular saw to said miter guide arm includes connecting the skid plate of the circular saw to the miter guide arm.

11. A circular saw and case assembly, comprising:
   a circular saw having a skid plate;
   a case that defines an internal area large enough to store the circular saw;
   a miter guide arm extending from said case;
   a sled supported by said miter guide arm that can move reciprocally on said miter guide, wherein said sled selectively receives and retains said circular saw, therein enabling said circular saw to move reciprocally on said miter guide arm.

12. The assembly according to claim 11, wherein said miter guide arm is selectively adjustable relative said case in multiple orientations.

13. The assembly according to claim 11, wherein said sled selectively retains said circular saw by engaging said skid plate of said circular saw.

* * * * *